April 7, 1964     H. E. DE BUHR     3,127,976

BALE-HANDLING MECHANISM

Filed Feb. 9, 1960     4 Sheets-Sheet 1

INVENTOR.
H. E. DE BUHR

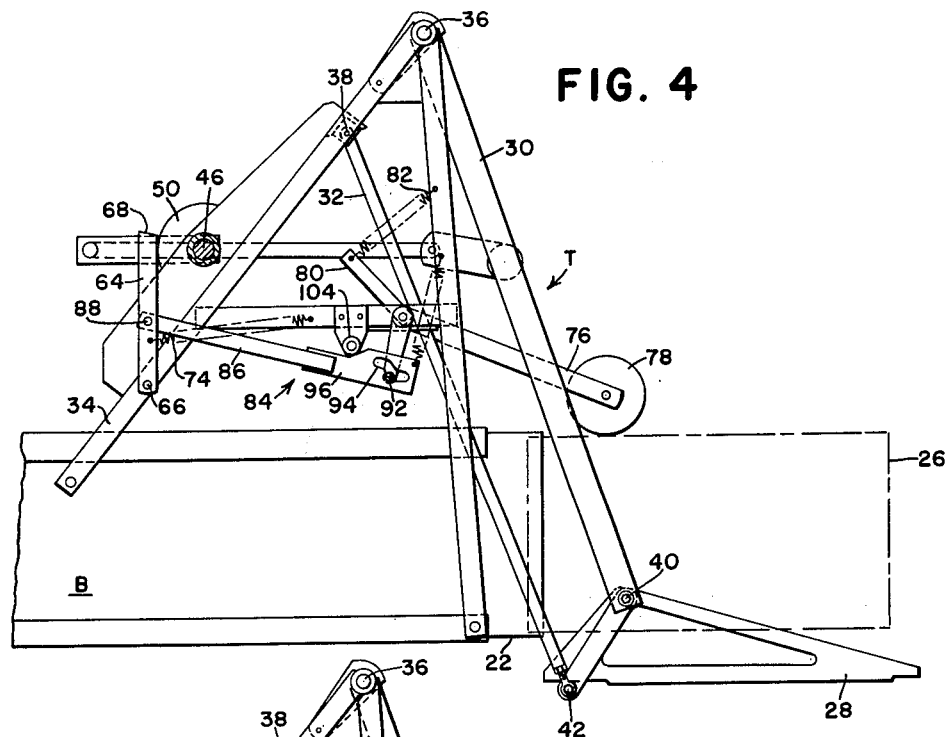
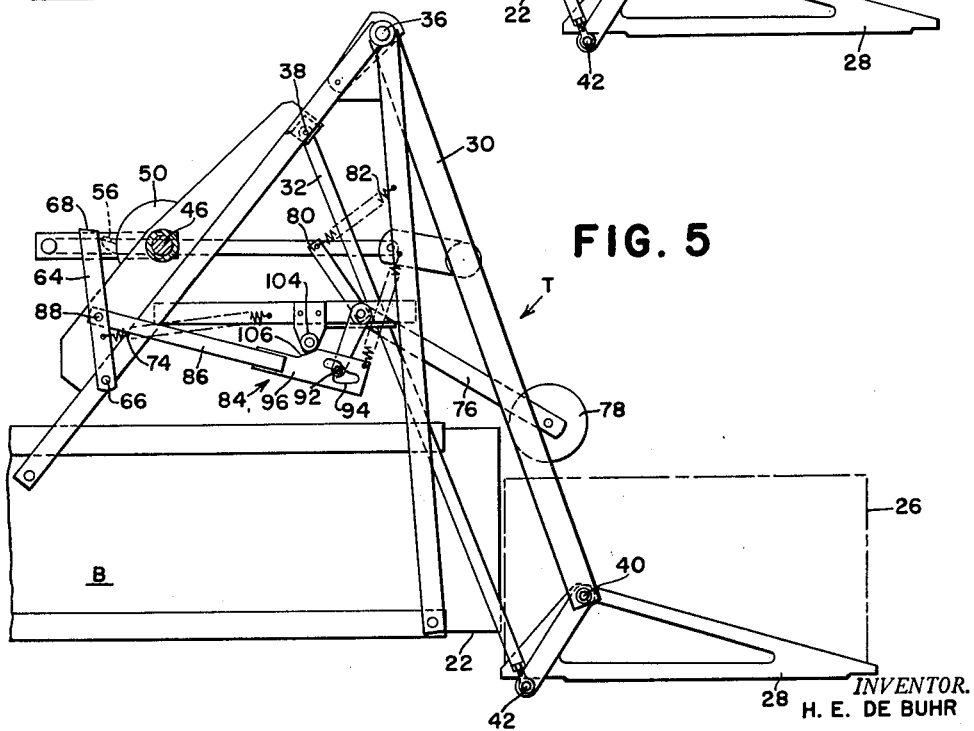

INVENTOR.
H. E. DE BUHR

April 7, 1964    H. E. DE BUHR    3,127,976
BALE-HANDLING MECHANISM
Filed Feb. 9, 1960    4 Sheets—Sheet 4

INVENTOR.
H. E. DE BUHR

United States Patent Office 3,127,976
Patented Apr. 7, 1964

3,127,976
BALE-HANDLING MECHANISM
Harold E. De Buhr, Ottumwa, Iowa, assignor to Deere & Company, Moline, Ill., a corporation of Delaware
Filed Feb. 9, 1960, Ser. No. 7,718
6 Claims. (Cl. 198—128)

This invention relates to bale-handling mechanism and more particularly to that type of mechanism commonly known as a bale thrower, which is attachable to or mounted on the rear or equivalent discharge end of a typical agricultural baler of the pick-up type, whereby to facilitate and render substantially automatic the process of picking up hay, forming it into bales, and delivering the bales to a trailing wagon.

The forerunner of mechanism of this type is exemplified, for example, in the patent to Morrison 2,756,865, which features a pair of swingable arms mounted at the rear of the baler and equipped with gripper means for engaging opposite sides of an emerging bale and being powered by drive mechanism which swings the arms upwardly and rearwardly to traject the bale into the trailing wagon. The present invention features improvements in bale throwers of the swinging arm type and has for its principal object the provision of an improved means on the arms for receiving the bale. It is a feature of the present invention to provide the receiver in the form of a pan or the like which eliminates the need for special bale-gripping devices. Another object of the invention is to improve the arm means by incorporating therein parallel link means operative to maintain the position of the receiver in such relationship to the bale trajectory as to improve the throwing of the bale to the trailing wagon.

As respects bale-handling mechanism in general, the invention features a novel control means for energizing and de-energizing the driving mechanism. In this respect, it is a feature of the invention to utilize the principle of causing the bale to move laterally relative to its line of emergence from the bale case so that when it moves onto the receiver it departs from its normal path, whereby the bale thrower does not have to act against the frictional forces between the bale and the bale case from which it emerges. Another object of this invention is to utilize the offset or change in direction of the bale to initiate control mechanism which in turn energizes and de-energizes the drive mechanism for the bale-handling mechanism. A further object resides in improved bale-sensing and control means utilizing a normally disabled force-transmitting connection which is triggered or cocked as the bale follower moves to a preliminary position incident to discharge of the bale over the bale discharge portion prior to its receipt by the receiver.

Further objects reside in the provision of improved protective or shield means for the thrower, thereby affording protection against injury to persons standing near the thrower while it is in operation.

The foregoing and other important objects and desirable features inherent in and encompassed by the invention will become apparent as preferred embodiments thereof are disclosed in detail in the accompanying description and appended drawings, the several figures of which are described below.

FIG. 4 is a view similar to FIG. 2 but showing the condition of the control mechanism when a bale is about to be received by the receiver.

FIG. 5 illustrates the relationship of the parts shown in FIGS. 2 and 4 in the condition they occupy when the bale moves to the receiver.

Figure 1:
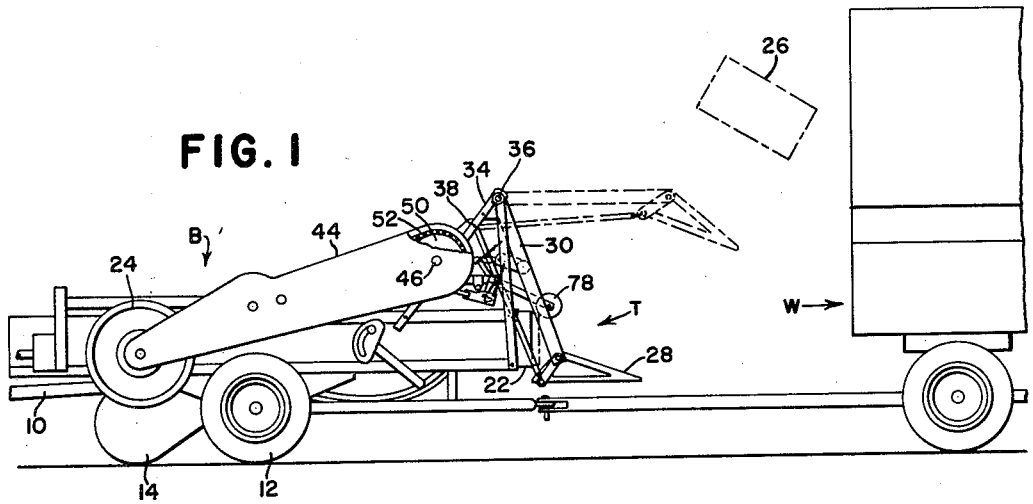
FIG. 1 is a small-scale elevation, with portions broken away, showing a typical vehicular train incorporating a baler, bale-handling mechanism and a trailing vehicle.

In the vehicular train shown in FIG. 1, the baler is designated by the letter B, the bale-handling mechanism by the letter T and the trailing wagon by the letter W. The baler is of the typical pick-up type and may be drawn by a tractor (not shown), through the medium of a draft tongue 10 forming part of the baler main frame which is supported on ground wheels 12. The numeral 14 represents the pick-up mechanism which is operative to pick up previously harvested hay from windrows in the field and to cause this hay to move ultimately to a fore-and-aft bale case in which a bale chamber is defined by a plurality of walls, including opposite sides 16, a top 18 and a bottom or floor 20, the plurality of walls defining a rear rectangular discharge opening or portion represented generally by the numeral 22. Those familiar with the art will appreciate that bales are successively formed in the bale chamber by means of a reciprocating plunger (not shown) powered by means including a flywheel 24. Successive bales in the chamber are formed and tied and emerge successively past the rear discharge portion 22. A representative bale is shown in broken lines and is designated by the numeral 26.

Considered broadly, the bale-handling mechanism T comprises a receiver or receiving pan 28 normally or initially disposed adjacent to the bale discharge portion 22 and mounted by a pair of parallel links 30 and 32 on support means including a framework 34 which in turn is connected to the bale case walls. The pivots for the upper ends of the links 30 and 32 are provided at an upper part of the support and are transverse to the normal path of movement of the emerging bale 26 as it moves to the discharge portion 22. These pivots are designated respectively at 36 and 38. The lower ends of the links are pivotally connected respectively at 40 and 42 to the receiver 28. Drive mechanism, to be described later, is controlled by suitable bale-sensing and control means, also to be described later, for causing the receiver 28 to swing from the loading position of FIGS. 1 and 2 (full lines) to an unloading or discharging position as shown in broken lines in FIG. 1, whereupon the bale 26 is trajected to the wagon W as will be obvious, the front end of the wagon being open to receive the bale. In this manner, the baling operation is rendered substantially automatic, since the pick-up baler, which itself is primarily automatic, is augmented by the automatic bale-handling mechanism so that manual labor in handling bales between the baler and the wagon is eliminated.

Figure 2:
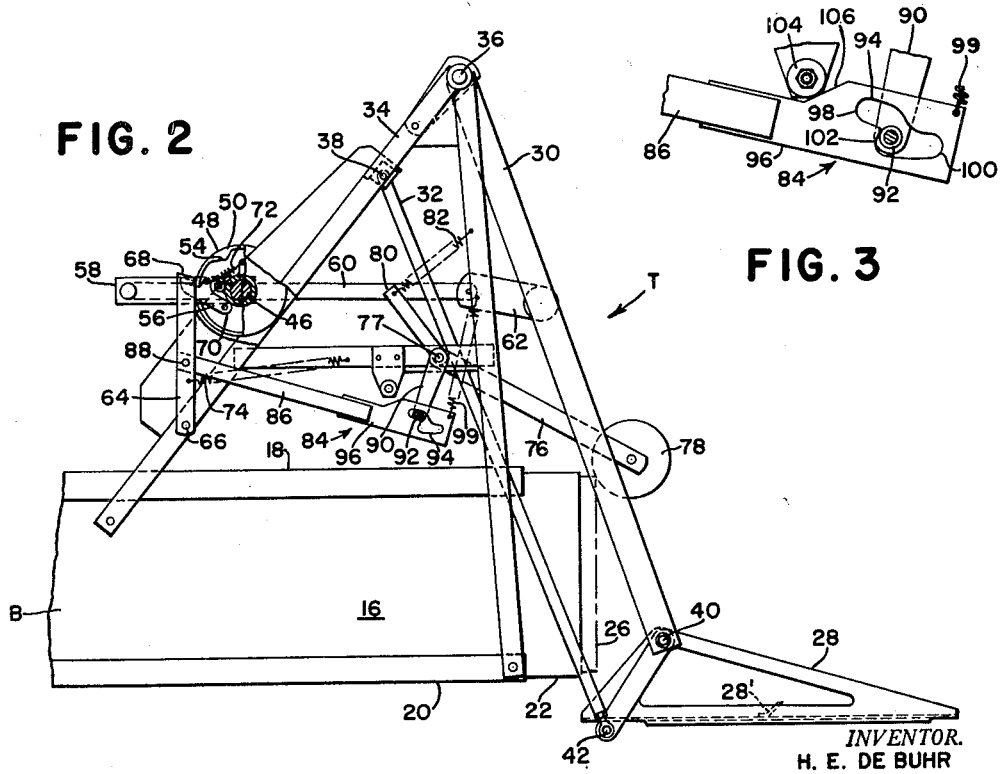
FIG. 2 is an enlarged fragmentary elevation of the rear portion of the baler and the bale-handling mechanism, showing the bale receiver in its loading position.
Figure 6:
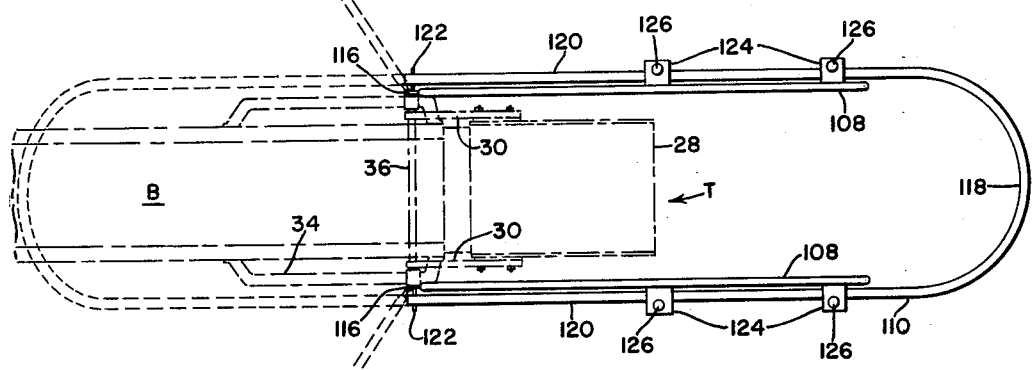
FIG. 6 is a plan, with portions of the baler and bale-handling mechanism shown schematically, illustrating a preferred form of guard or shield means for the bale-handling mechanism, broken lines illustrating what may be regarded as folded positions of the shields and guard.

The bale receiver 28, as best shown in FIG. 6, is of U-shaped cross section as seen from the front or rear and has opposite sides to which the pivotal connections 40 and 42 are made. It will be understood, of course, that there is another pair of arms 30 and 32 at the opposite side of the structure. The pivot 36 is established by a transverse shaft across the upper part of the supporting frame 34 which, as best seen in FIG. 6, is likewise composed of opposite sides rigidly connected to the baler. At this point, it should be noted that the bale-handling mechanism T could be provided as a separate unit towed behind the baler if desired. Consequently, the present mounting structure does not import any limitations into the invention. The arms 30 and 32 are, in their normal positions, as shown in FIG. 2, of sufficient length and so arranged as to geometry to dispose the pan 28 in a loading position in which its floor is slightly below the discharge portion 22. Stated broadly, the receiver 28 in its loading position is offset from the discharge portion 22 in a direction transverse to the normal line of travel of the emerging bale 26 as the bale moves to the receiver. The progress of the bale in moving from the discharge portion 22 to the receiver is illustrated in FIGS. 4 and 5, the latter illustrating that the bale 26 has moved rearwardly clear of the discharge portion 22 so as to drop onto or descend to the receiver 28. This principle, of causing the bale to clear the discharge portion 22 before the receiver is actuated, means that the receiver may be operated without interference from any frictional forces that the baler may impart to the bale. In other words, the bale, carried by the receiver 28 in the position of FIG. 5, is now entirely independent of the bale case. Moreover, as the receiver returns from its unloading position (broken lines in FIG. 1) it will pass clear of a succeeding emerging bale and consequently will not contact such bale as would be the case in some designs of the gripper-type of bale thrower. A still further advantage of this arrangement is that the descent of the bale onto the receiver is utilized to initiate mechanism for causing drive mechanism to function to swing the receiver between its loading and unloading positions and return.

For the purpose of deriving power from the baler, suitable drive means, which may be of any type and are therefore shown as being enclosed in a safety shield 44, are used to connect the flywheel 24 to a transverse shaft 46 appropriately journaled on the supporting frame 34. Since the flywheel 24 is constantly driven and the shaft 46 must be intermittently driven, it is necessary to provide in the drive mechanism a suitable clutch whereby drive mechanism may be energized and de-energized. For this purpose, a typical one-revolution clutch is utilized, indicated here in general by the numeral 48. This clutch includes a constantly driven part 50 driven as by a chain 52 which is driven in the first instance from the flywheel 24 (FIG. 1). The part 50 is in the form of a drum having an internal hump or lug 54 which is normally disengaged from a pawl 56 pivoted to a hub which in turn is keyed to the shaft 46. The shaft 46 includes an intermediate crank arm portion 58 which is in turn connected by a pitman 60 to a connecting member 62 rigid on the arm or link 30. Since the links 30 are spaced transversely apart, the connecting member 62 serves as a cross brace between the two. However, these particular details may be varied to suit individual desires.

When the receiver 28 is in its loading position, the clutch is disengaged; that is, the pawl 56 is held in such position that it is clear of the lug 54 so that as the constantly rotating part 50 rotates in a clockwise direction, for example, the lug will clear the pawl and consequently the part 50 may rotate with the flywheel 24 while the shaft 46 remains stationary. When it is desired to engage the clutch, the pawl 56 is capacitated to move to a position in which the lug 54 on the succeeding revolution will engage the pawl and will consequently drive the shaft 46. As is typical in one-revolution clutches, the pawl is automatically disengaged after one revolution, thereby discontinuing rotation of the shaft 46 while permitting the constantly rotating part 50 to continue.

In the present case, the pawl is controlled by a pawl-control member 64 pivoted at 66 to any suitable part of the frame 34 and having an upper end portion 68 normally positioned to engage the pawl so as to keep it in a position in which its roller 70 is held in a radially inward position as respects the shaft 46. A spring 72 biases the pawl for outward movement so that when the pawl-control lever 64 is released from the pawl, the roller 70 will move outwardly into a position to be engaged by the lug 54. A spring 74 is connected between the lever 64 and any suitable part of the frame 34 to hold the pawl lever in the position of FIG. 2, in which position it retains the pawl against engagement with the roller 54.

It is a feature of the invention that engagement and disengagement of the clutch 48 is made dependent upon the position of a bale 26 relative to the receiver 28. In other words, as long as the receiver 28 is in its loading position and is empty, the pawl level 64 will be in a position shown in FIG. 2 so that the clutch 48 is disconnected, whereby the drive mechanism, which includes the pitman 60, of course, is de-energized. Therefore, the bale-handling mechanism or thrower T is idle, being normally arranged to await delivery thereto of the bale 26 as it goes through the conditions of FIGS. 2, 4 and 5. Energizing and de-energizing of the drive mechanism depends upon bale-sensing and control means, including, among other portions to be described, a follower 76 which is pivoted at its forward end at 77 to the frame 34 and which extends rearwardly and downwardly, having at its rear end a roller or follower wheel 78. The follower 76 includes an extension thereof which forms, relative to the pivot 77, a bell crank arm 80 which in turn is connected to a spring 82 anchored to the frame 34 so that the follower 76 is biased to a first or initial position, which is the position shown in FIG. 2, from which it will be seen that the roller or wheel 78 is in the path of emergence of the bale 26. Consequently, as the bale 26 emerges to the position of FIG. 4, and an infinite number of positions prior to that shown in FIG. 4, the roller 78 will be engaged by the bale and will ride the bale, being displaced from its initial position to what may be regarded as a second position as shown. Ultimately, as the bale 26 clears the discharge portion 22, it will drop to the receiver 28 and, since the follower 76 is biased downwardly, it will follow the bale, thereby returning to its first position.

As the bale is moving to its FIG. 4 position and short of its FIG. 5 position, it is desired that the drive mechanism be not energized, which energization should await the receipt of the bale 26 by the receiver 28. Accordingly, the force-transmitting means between the follower 76 and the pawl control lever 64 should be capable of being disabled during emergence of the bale short of the FIG. 5 position, and should be capable of being effectuated when the bale drops to the receiver, followed by the follower 76 as the follower returns to its initial or starting position.

Figure 3:
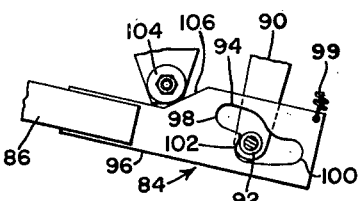
FIG. 3 is an enlarged fragmentary view of part of the force-transmitting means for controlling the drive mechanism.

For this purpose, a force-transmitting means, indicated in its entirety by the numeral 84, is provided, comprising a forward link 86 having a pivotal connection 88 to a mid-point on the pawl control lever 64. The rear end of the link includes a lost-motion connection, to be described subsequently, with an arm 90 rigid with the follower 76, the pivot 77 being preferably a rockshaft to which the follower 76, arm 80 and arm 90 are rigidly secured. The arm 90 carries at its free end a roller 92 which is received in an irregular slot 94 formed in a plate 96 which is rigidly affixed to the rear end of the control link 86. The details of the slot are best shown on an enlarged scale in FIG. 3 and reference will be had to that figure for the immediately following description.

The link 86 is normally biased upwardly by a spring 99 so that the slotted plate 96 moves constantly upwardly, but the position of the roller in the slot will be determined by the position of the roller in a fore-and-aft relation, and this in turn will depend upon the angular position of the follower 76.

The configuration of the slot 94 is such as to give it front and rear ends 98 and 100, plus an intermediate stop or abutment portion 102. Additionally, the slot is so shaped that the front and rear ends are at different elevations, and the width of the slot in the area of the abutment 102 is such that the roller may bypass the abutment under certain conditions. In the condition of the parts shown in FIG. 3, the roller 92 is in engagement with the abutment and therefore the connection is capacitated to transmit force between the follower 76 and the pawl control arm 64 as the follower and roller 78 drop following descent of the bale from its FIG. 4 position to its FIG. 5 position. However, when the follower is in its initial position prior to the emergence of a bale from the bale case, which represents the downwardmost position of the follower, the roller 92 will be in the upper portion of the slot as shown in FIG. 2. The tendency of the spring 99 to pull upwardly on the link 86 and the tendency of the spring 82 to rock the rockshaft 77 in a clockwise direction tends to move the roller 92 toward the forward end of the slot, but the emergence of a bale establishes a condition of what may be regarded as equilibrium. Nevertheless, the roller 92 is above the abutment 102 and prevents the link from moving its maximum distance upwardly. As the bale emerges to a condition prior to that shown in FIG. 4, it swings the follower 76 in a counterclockwise direction, thus removing the roller 92 from above the abutment 102, whereupon the spring 99 is effective to move the link 86 upwardly until it engages a stop roller 104 mounted on the frame 34. The plate 96 at this point is provided with a cam 106. Even though there be irregularities in the top surface of the bale on which the roller 78 rides, so as to tend to cause rocking of the rockshaft 77, this will have no effect on the force-transmitting connection 84, since the roller 92 may move freely back and forth in the lower part of the slot between the abutment 102 and the rear end of the slot 100. Thus, as the follower 76 occupies its second or displaced condition, it does not affect the force-transmitting connection 84 and consequently the drive mechanism remains de-energized.

As the bale drops from the FIG. 4 position to the FIG. 5 position, and thus is received by the receiver 28, it is followed by the follower 76 which now moves downwardly. However, since the link 86 is in its uppermost position, permitted by the lowest portion of the cam 106, the roller 92 must perforce move forwardly against and engage the abutment 102, thereby effectuating the force-transmitting connection so that as the roller 78 moves downwardly, carrying with it the arm 76 under action of the spring 82, sufficient force is generated to shift the link 86 forwardly, which consequently swings the lever 64 in a counterclockwise direction and frees it from the pawl 56, whereby the pawl can be engaged by the driving lug 54 on the constantly rotating part 50. This of course energizes the drive mechanism so that the loaded receiver 28 is caused to swing from its loading position to its unloading position. There is sufficient accelerative force in the drive mechanism to cause the bale 26 to be trajected to the wagon W, as shown in broken lines in FIG. 1. The timing of the clutch 48 and the linkage represented by the pitman 60 and parallel links 30 and 32 is such that the receiver 28 will be returned to its loading position during one revolution of the clutch 48, at which time the pawl control lever 64 is back to its original position so as to intercept the pawl 56. This occurs because of a re-disconnection of the force-transmitting connection 84, which results from the following: As the follower 76 moves in a clockwise direction and transmits force through the arms 90 and roller 92 to the slot lug 102, to drive the link 86 forwardly, the cam 106 on the plate 96 rides under the roller 104 on the frame 34. This causes the link 86 to be displaced downwardly, disengaging the roller 92 from the abutment or lug 102, whereupon the roller rides over this abutment and enters the forward portion 98 of the slot. A preliminary condition in this respect is shown in FIG. 5. FIG. 2 of course shows the position in which the roller 92 has escaped the abutment and is therefore free in the fore-and-aft length of the upper portion of the slot. The spring 74, which acts to return the control lever 64, is therefore sufficient to swing this lever rearwardly, taking with it the link 86 which, as previously recited, is now free to move rearwardly, unimpeded by the roller 92. During this rearward movement, the roller 92 in the upper portion of the slot keeps the link 84 away from the cam roller 104, and, the drive mechanism being de-energized, the control mechanism is conditioned for operation to handle a succeeding bale. That is to say, the condition is now repeated as to FIG. 2, FIG. 4 and FIG. 5 and, as already described, the control mechanism in FIG. 4 is ineffective to cause force to be transmitted by the force-transmitting connection 84. Stated briefly, the force-transmitting connection 84, being disabled in the position of FIG. 2, is cocked or capacitated in the position of FIG. 4 to transmit the force necessary to energize the drive mechanism, the difference between the disabled condition and the effective condition of the connection 84 being represented by the difference between the vertical position of the slot relative to the roller 92. That is to say, in FIG. 2 the roller can move back and forth in the upper portion of the slot, free of the abutment 102, whereas in the FIGS. 4 and 5 positions, the roller 92 must perforce engage the abutment 102 because of the change in vertical position of the slot relative to the roller. Re-conditioning of the connection 84 to effect the disabling thereof is achieved by the cam and roller 106 and 104.

Figure 7:
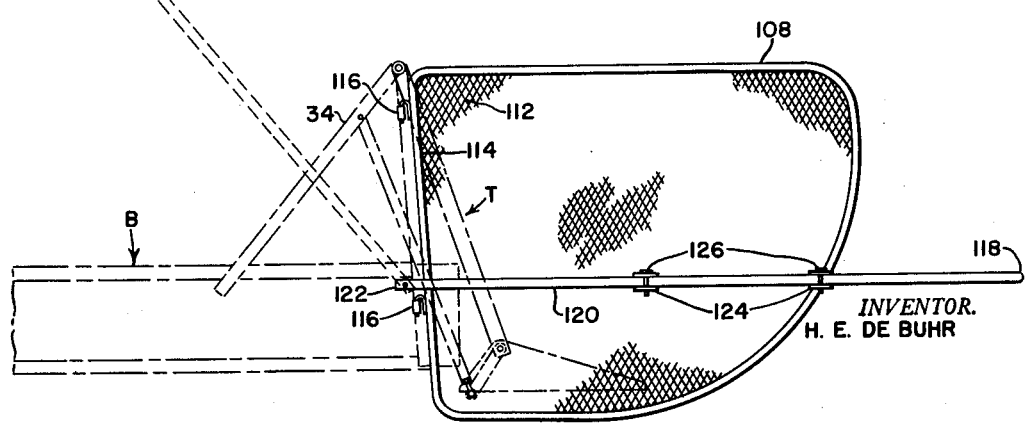
FIG. 7 is an elevation of the structure shown in FIG. 6, dotted lines being again employed to illustrate the folded position of the guard.
Figure 8:
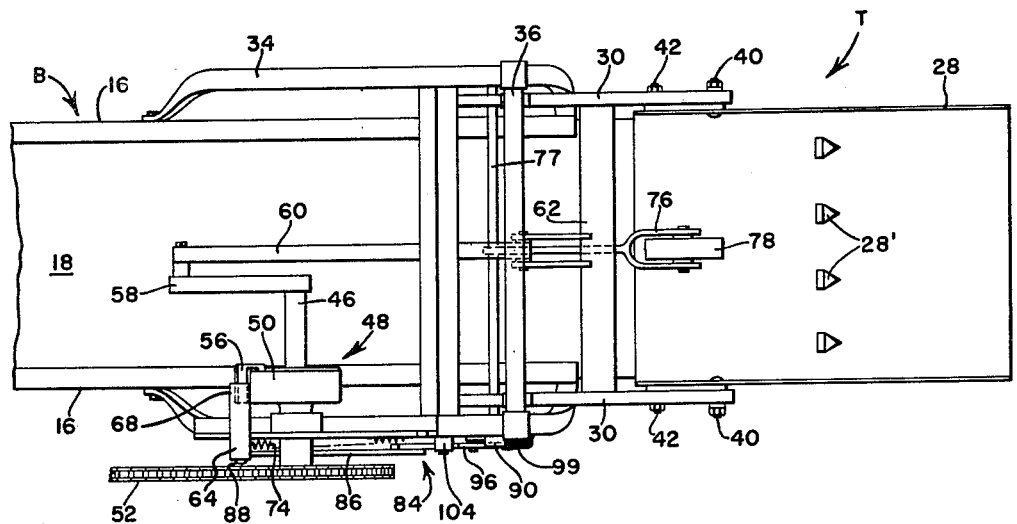
FIG. 8 is a plan view of the structure shown in FIGS. 1–5.

FIGS. 6 and 7 illustrate the machine equipped with protective means comprising a pair of side shields 108 and a guard 110. Each side shield is made up of a frame, preferably tubular, which carries an appropriate protective screen 112, and each frame is so shaped that it has a generally upright forward edge portion 114 which is mounted on the supporting frame 34 by upper and lower hinge means 116 which are coaxial on a generally vertical axis. In their normal positions, the shields respectively flank opposite sides of the mechanism T, in which positions they are maintained by cooperation with the guard 110, which is in the form of a U, having a bight 118 and opposite fore-and-aft legs 120. The forward end of each leg is proximate to the respective side of the supporting frame 34 and is pivoted there at at 122, the pivots 122 being of course coaxial on a transverse horizontal axis. In normal position, the legs 120 of the guard 110 lie laterally outwardly of the respective shields 108 and the bight 118 is to the rear of the mechanism T. This establishes a protective means about the mechanism T so that during operation thereof persons standing close thereto will not be injured.

The arrangement features provision for removability or folding of the shields and guards so that access may be had to the mechanism. For this purpose, the shields and guard are interconnected by releasable means, here comprising four U-shaped elements 124 rigidly secured respectively to the shields 108 and extending outwardly so as to receive or embrace proximate portions of the guard legs 120. Each element 124 has a removable pin 126 and the legs of the element are appropriately apertured to removably receive the pins. When the pins are in place, the three protective elements 108, 108 and 110 are securely maintained in the full-line positions shown in FIGS. 6 and 7. When the pins are removed, the shields 108 may be moved laterally inwardly sufficiently to free the elements 124 from the legs 120 of the U-shaped guard 110, and thereafter the guard may be swung forwardly and upwardly to the dotted-line position as indicated. Following this, the shields 108 may be swung laterally outwardly as indicated in dotted lines. Thus, the protective means has the advantage of being capable of occupying two positions, one its normal position in which the shields and guard are in place and the other a folded position in which the shields and guard provide access to the mechanism for adjustment and/or repair thereof.

It will thus be seen from the foregoing that the improved bale-handling mechanism incorporates many novel features and that it may be provided as an attachment for the baler or may be designed to be an integral part of the baler, so that the mechanism may be sold as regular equipment or as an attachment. The simplicity of the design results in a relatively low-cost mechanism, besides one that is easy to operate, maintain and service.

In order to improve the retention of the bale on the pan 28, the pan may be provided with gripping means, such as a transverse row of rearwardly and upwardly projecting prongs 28' (FIG. 2). Any other form of gripping means may be used so long as they serve the function of overcoming any tendency of the pan to run out from beneath the bale when the pan starts on its throwing stroke.

Another feature of the invention is that the automatic throwing function of the ejector may be locked out by holding the follower 76 in its maximum up position, utilizing any suitable means for holding the follower in that position so that the trip mechanism will not operate. Thus, the pan 28 will remain stationary in its normal or loading position and will serve simply as an extension of the bale case so that bales may be discharged over and off the pan in the same manner as any conventional baler without an ejector. This form of operation may be found desirable from time to time and when it is it is not necessary to remove the entire ejector from the baler, as required in prior art machines.

Features of the invention other than those categorically enumerated will readily occur to those versed in the art, as will many modifications and alterations in the preferred embodiment of the invention disclosed, all of which may be achieved without departure from the spirit and scope of the invention.

What is claimed is:

1. For a baler having a discharge portion over which bales are successively discharged, a bale thrower, comprising: support means; means for connecting the support means to the baler adjacent to said discharge portion; a bale receiver initially disposed in a loading position adjacent to said portion and at a level therebelow so that a bale discharged over said portion is caused to descend to said receiver; means mounting the receiver on the support means for accelerative movement from said loading position to an unloading position and back to said loading position for throwing the received bale from adjacent to said portion and for returning to said loading position for a succeeding bale; drive mechanism connected to the receiver and de-energized when the receiver is in said loading position; and bale-sensing and control means operative on a bale moved over said discharge portion and connected to the drive mechanism and operative in response to descent of a bale onto said receiver to energize said mechanism and operative to incur de-energizing of said mechanism when the receiver returns to said loading position.

2. The invention defined in claim 1, in which: the support means includes a pair of parallel, spaced apart pivots transverse to the line of movement of the receiver between its loading and unloading positions; the receiver has a pair of parallel, spaced apart pivots parallel to said first-mentioned pair of pivots; and the mounting means includes a pair of parallel link means respectively connecting the support pivots to the receiver pivots to mount the receiver for swinging between its said positions.

3. The invention defined in claim 1, in which: the driving mechanism includes a clutch that is disengaged to de-energize said mechanism; the bale-sensing and control means includes a follower adapted to ride the bale as it moves to and over the discharge portion and means biasing the follower downwardly when the bale descends to the receiver, and a control connection between said follower and the clutch for engaging the clutch when the follower moves downwardly, said clutch being of the self-interrupting type so as to return to disengaged status after return of the receiver to its loading position, said control connection including a lost-motion device enabling return of said clutch to said disengaged status.

4. The invention defined in claim 1, in which: the bale-sensing and control means includes a follower shiftable on the support means between a first position extending into the path of a bale moving to and over the discharge portion and a second position displaced away from said first position as said follower is engaged by and rides the bale until the bale descends to the receiver, said follower being biased to said first position so as to move thereto when the bale descends to the receiver, and force-transmitting means between the follower and the drive mechanism and including a connection disabled initially in the first position of the follower so as to enable movement of the follower to its second position without affecting the drive mechanism, said connection being constructed to become effective responsive to movement of the follower to said second position so as to be capable of transmitting force to energize the drive mechanism when the follower moves to its first position following descent of the bale to the receiver.

5. For a baler having a discharge portion over which bales are successively discharged along a certain path, a bale thrower, comprising: support means; means for connecting the support means to the baler adjacent to said discharge portion; a bale receiver initially disposed in a loading position adjacent to but offset from said portion transversely to said path so that a bale discharged over said portion must change direction transverse to said path to move to said receiver; means for causing said bale to change direction as aforesaid; means mounting the receiver on the support means for accelerative movement from said loading position to an unloading position and back to said loading position for throwing the received bale from adjacent to said portion and for returning to said loading position for a succeeding bale; drive mechanism connected to the receiver and de-energized when the receiver is in said loading position; and bale-sensing and control means operative on a bale moved over said discharge portion and connected to the drive mechanism and operative in response to the change in direction of a bale as the bale moves onto said receiver to energize said mechanism and operative to incur de-energizing of said mechanism when the receiver returns to said loading position.

6. For a baler having a discharge portion over which bales are successively discharged, a bale thrower, comprising: support means; means for connecting the support means to the baler adjacent to said discharge portion; a bale receiver initially disposed in a loading position adjacent to said discharge portion and having a bale-supporting bottom disposed in a generally level condition in said loading position and onto which a discharged bale moves from said discharge portion; and means mounting the receiver on the support means for accelerative movement from said loading position to an unloading position and return respectively for throwing the received bale distantly from the baler and for returning said receiver to said loading position for receiving a further bale, said mounting means including arm structure having first and second pivotal connections respectively to the support means and to a first portion of the receiver for swinging of said second connection and first receiver portion about said first connection in an upward and outward arc relative to said discharge portion and control means connected to the support means and to a second portion of the receiver for positively tilting the receiver about said second connection as said receiver swings with the arm means to cause the receiver bottom to incline downwardly and outwardly away from its level condition as the receiver reaches its unloading position and to return to said level condition as said receiver returns to its loading position.

References Cited in the file of this patent
UNITED STATES PATENTS 1,640,677     Smiley _____ Aug. 30, 1927

(Other references on following page)

UNITED STATES PATENTS

| | | |
|---|---|---|
| 1,849,385 | Sekulski | Mar. 15, 1932 |
| 2,181,881 | Ferris | Dec. 5, 1939 |
| 2,410,516 | Messenger et al. | Nov. 5, 1946 |
| 2,543,302 | Rossiter | Feb. 27, 1951 |
| 2,633,253 | Martin | Mar. 31, 1953 |
| 2,756,865 | Morrison | July 31, 1956 |
| 2,785,811 | Forth | Mar. 19, 1957 |
| 2,827,154 | Forth | Mar. 18, 1958 |
| 2,827,155 | Callum | Mar. 18, 1958 |
| 2,894,651 | Forth et al. | July 14, 1959 |
| 2,979,214 | Selzer | Apr. 11, 1961 |